P. LAMBRAKOS.
MILK CAN HANDLE.
APPLICATION FILED SEPT. 18, 1919.
1,353,050. Patented Sept. 14, 1920.
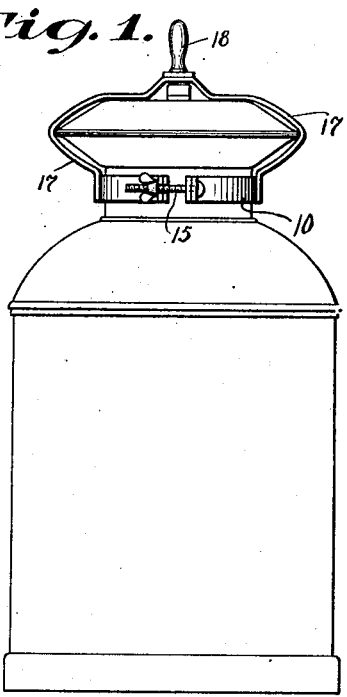
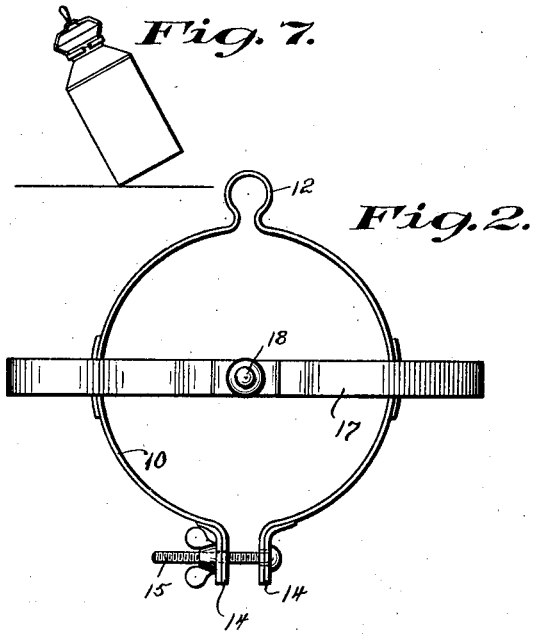
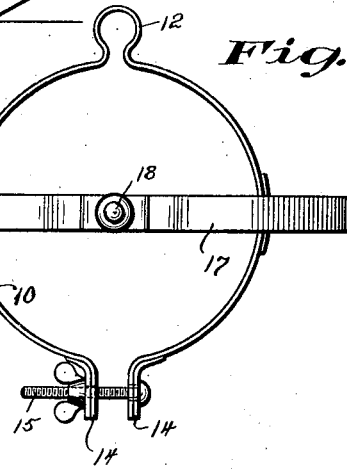
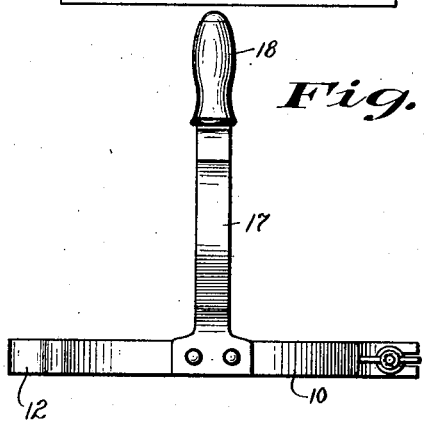
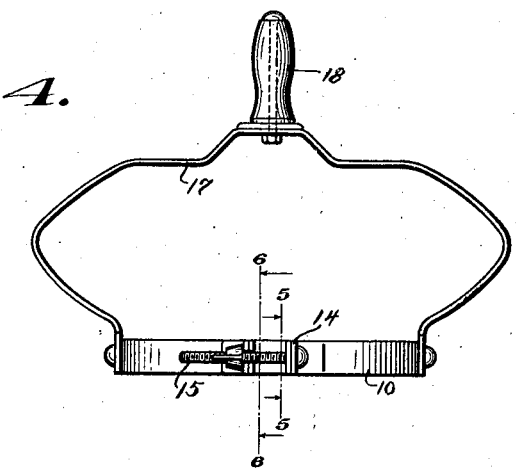
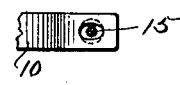
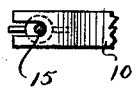
WITNESSES
INVENTOR
PETER LAMBRAKOS
BY
ATTORNEYS

UNITED STATES PATENT OFFICE.

PETER LAMBRAKOS, OF NEW YORK, N. Y.

MILK-CAN HANDLE.

1,353,050.  Specification of Letters Patent.  Patented Sept. 14, 1920.

Application filed September 18, 1919. Serial No. 324,326.

*To all whom it may concern:*

Be it known that I, PETER LAMBRAKOS, a citizen of Greece, and a resident of New York, borough of Manhattan, county of New York, and State of New York, have invented a new and Improved Milk-Can Handle, of which the following is a full, clear, and exact description.

This invention relates to handle attachments, and more particularly to a handle device for clamping upon cylindrical bodies such as milk cans and the like to facilitate the handling and transportation of the milk cans.

It is an object of this invention to provide a handle attachment having a rotatable element rigidly mounted on a frame, the whole of which may be quickly and conveniently attached to a milk can or other cylindrical body so as to provide a centrally disposed and rigidly mounted handle member the axis of which is coincident with the axis of the milk can.

In moving and transporting large milk cans, it has been the custom to drag the can over the floor, such as a concrete floor or railroad car floor, or roll it on its side when empty. This treatment subjects the can to more or less damage and loss in the property of the cans finally results. In handling milk cans it would be convenient to roll the can along on its lower rim, but this has not been universally practical because it is difficult to balance the can and cause it to roll properly along its rim or base.

I have therefore in view to provide a centrally disposed rotatable handle member which the express man, or others who handle the cans, may grasp the handle with one hand and speedily roll the can along the rim or base by the other hand.

With the above principal objects in view, and the purpose being to provide a milk can handle, but keeping in mind the possible adaptation of my handle attachment for other bodies containers or packages handled in transit, the invention has relation to the several handle attachments as set forth in the appended claims, and one practical and preferable example of which is described in this specification, and portrayed in the accompanying drawings, wherein:

Figure 1 illustrates a large milk can shown in elevation with the handle attachment applied thereto.

Fig. 2 illustrates a plan view of the handle attachment removed from the can, while Fig. 3 shows the device in side elevation, and Fig. 4 shows the device in elevation at a quarter view from the illustration in Fig. 3.

Figs. 5 and 6 respectively illustrate the two open ends of a clamp band to show how a clamp bolt may best be attached to the ends of the open ring or clamp band to facilitate the clamping action of the device upon a can.

Fig. 7 shows a small view of a milk can with the device attached tilted up on its base rim to illustrate how the handle may be grasped to balance the can on its rim to enable said can to be rolled along a floor surface.

A handle attachment constructed according to the plans of my invention comprises a frame to rigidly join with the body to be handled or moved. The rigid frame preferably consists of an expansible and contractible band. A handle yoke is rigidly joined with the band, and a rotatable hand grip or handle is mounted on the yoke.

In further describing my invention, and in presenting details thereof reference is had to the aforesaid drawings where reference numerals are used to specifically designate parts. A clamp band 10 comprises an open ring, and the band includes an expansion loop 12 which is integrally formed in the ring diametrically opposite the opening or ends of the said ring. The opened ends of the ring are turned outwardly and approximately radially with the ring. The ends of the ring are designated by the numeral 14, and to further strengthen and stiffen the clamp band ends, there is welded, riveted, or otherwise attached, a strong metal reinforcement piece applied to the outside of each end member. This provides a very strong and stiff end member. The two adjacent end members of the clamp band form clamp jaws. These clamp jaws are fitted with any suitable device for drawing the band together, and for clamping it to a round body. A bolt 15 and wing-nut are suitable for this purpose. The clamp band should be made of spring steel to facilitate placing and removing of the device on and from a can. The clamp band may be made of one piece spring material or may be constructed in sections according to the most practical designs for each particular size of handle device.

A handle yoke 17 is rigidly joined to the clamp band by riveting or welding the extremities of the handle yoke to the clamp band, and by disposing the yoke ends diametrically opposite one to the other. A rotating hand grip or handle 18 is mounted on a spindle or shank fixed to the upper central portion of the handle yoke. The hand grip 18 is made to turn freely on the spindle as is the case with many types of handles. The handle yoke is made of spring material to allow the yoke to expand, that is to open and close during the opening and closing of the clamp band. The hand grip member 18 hould be mounted on the handle yoke coincident with the axis of the clamp band.

Figs. 1 and 7 illustrate the device applied to a milk can. In mounting the handle attachment to a can, the clamp bolt is removed from the clamp jaws and the band sprung open to permit it to be placed around the neck of a milk can. The expansion loop 12 allows the spring clamp band 10 to be rigidly opened as considerable resiliency is inherent within the expansion loop and facilitates the opening and closing of the band around a cylindrical body. The expansion loop also allows a relatively small range of variation in diametrical size of the band, that is to say the band may be applied to cylindrical objects varying in size, and the expansion loop contracts and expands to accommodate the variation in size of the bodies when inserted in the clamp band. The clamp bolt or other attachment is then applied and the band is clamped and drawn tightly about the neck of the can. This places the hand grip coincident with the axis of the hand and the express man or other parties handling the can may grip the handle with one hand and rotate the can with his other hand. This handle attachment permits the milk cans to be handled in a more facile and remarkably fast manner, and obviates damage thereto.

In some cases it may be preferable to employ other forms of clamp devices than that shown in drawings, Fig. 5 and Fig. 6. Where a bolt and nut is used it is practical to slot out one clamp jaw and provide an elongated hole in the other clamp jaw to effect quick adjustment of the clamp bolt. However, other forms of attachment clamps may be used without departing from the spirit of my invention, and which might be more convenient than the clamp bolt described. The invention is presented to fulfil a long felt want for a device of this character.

Having thus described my invention and presented a preferable example of handle adjustment constructed in accordance with my invention, I claim the following several handle attachment designs as coming within the purview of my invention.

Claims:

1. A handle attachment for cylindrical bodies such as milk cans, and used to facilitate the rolling and handling thereof, comprising in combination: a frame attachable to a body, and a handle rotatably mounted on the frame coincident with the axis of the cylindrical body.

2. A handle attachment for cylindrical bodies such as milk cans, and used to facilitate the rolling and handling thereof, comprising in combination: a frame attachable to a body, and a handle rotatably mounted on the frame coincident with the axis of the cylindrical body to which it is applied, and an expansion loop included in the frame structure to permit expansion and contraction of the frame.

3. A handle attachment for cylindrical objects such as milk cans, and to facilitate the handling thereof, comprising: a clamp band, a clamp fixture associated therewith, a yoke fixed to the clamp band, a hand grip rotatably mounted on the yoke coincident with the axis of the object to which it is attached, and an expansion loop formed in the clamp band.

4. A handle attachment to facilitate the handling of cylindrical objects such as milk cans, comprising: a ring having an opening formed therein, clamp jaws made on the ring at the opening, a clamp screw carried by the clamp jaws for drawing the ring together, a handle yoke made in the form of a U shaped member with free extremities of the yoke fixed to the ring, and a hand grip rotatably mounted on the yoke member, the axis of said hand grip being in alinement and coincident with the axis of the object to which it is attached.

5. A handle attachment to facilitate the handling of cylindrical containers such as milk cans, comprising: a ring having an opening formed therein, clamp jaws made on the ring at the opening, a clamp screw carried by the clamp jaws for drawing the ring together, a handle yoke made in the form of a U shaped member with free extremities of the yoke readily fixed to the ring, and a hand grip rotatably mounted on the yoke member coincident with the axis of the container to which it is attached, and an expansion loop made in the ring to facilitate the opening and closing of the ring.

6. The combination with a cylindrical container, of a handle, and means rotatably supporting same therefrom coincident with the axis of the container, as and for the purpose specified.

PETER LAMBRAKOS.